United States Patent [19]

Wallace et al.

[11] 4,176,749

[45] Dec. 4, 1979

[54] MATERIALS SEPARATION

[75] Inventors: Walter M. Wallace, Carlisle; Geoffrey F. Craven, Bradford, both of England

[73] Assignee: Nortn-Harty Colliery Engineering Limited, England

[21] Appl. No.: 868,931

[22] Filed: Jan. 12, 1978

[30] Foreign Application Priority Data

Jan. 15, 1977 [GB] United Kingdom ................ 1659/77
Apr. 30, 1977 [GB] United Kingdom ............... 18172/77

[51] Int. Cl.² ............................................... B03B 5/24
[52] U.S. Cl. .................................... 209/457; 209/500
[58] Field of Search ............... 209/457, 491, 496, 499, 209/500, 502, 484, 455; 340/618, 621; 73/290 R, 290 V

[56] References Cited

U.S. PATENT DOCUMENTS

| 2,960,678 | 11/1960 | Beard et al. | 73/290 V X |
| 3,212,338 | 10/1965 | O'Maley | 73/290 V X |
| 3,285,414 | 11/1966 | Bosman | 209/457 |
| 3,797,660 | 3/1974 | Miller | 209/499 |

FOREIGN PATENT DOCUMENTS 899189  6/1962  United Kingdom ..................... 209/496

*Primary Examiner*—Ralph J. Hill
*Attorney, Agent, or Firm*—Parmelee, Miller, Welsh & Kratz

[57] ABSTRACT

A wash box for separating materials produced in, for example, a mining operation, into fractions of different densities. The machine is divided vertically into compartments, including at least one stratification compartment and at least one reject compartment, the raw material being delivered onto the grid, the level of water in the compartments being higher than the grid. Vertical pulsations are applied to the water in the compartments, causing the water to travel through the perforations of the grid, to stratify the material on the grid, while movement of the water through the wash box tends to carry the lighter fraction from the wash box.

The pressure which pertains in the stratification compartment is continually monitored, such as by the use of a beam, emitted into a stand pipe connected to the stratification compartment, and which is reflected by the surface of the water in the stand pipe, the time taken for the beam to travel from the emitter to a receiver being used to produce an output signal, dependent upon the pressure pertaining in the stratification compartment. This continual monitoring is advantageously used to control the pulsations applied to the adjacent reject compartment, controlling the rate at which reject material falls over the edge of the grid, but may be used to advantage in the general control of operation of the wash box.

Alternatively or in addition, separate conveyor means are provided, at differing vertical levels, for removing the reject materials of smaller size, which pass through the perforations of the grid, and the reject materials of larger size, which pass over the edge of the grid. Such an arrangement is particularly advantageous where the wash box is a compound wash box.

21 Claims, 10 Drawing Figures

MATERIALS SEPARATION

BACKGROUND OF THE INVENTION

1. Field of the Invention

This invention relates to the separation of materials, produced for example by a mining operation, into fractions of different densities.

2. Description of the Prior Art

In for example the mining of coal, a mixture of coal and shale is produced from the face being mined, and it is necessary to separate the coal from the shale by the use of automatic machinery. Conventionally used for this operation is a wash box (hereinafter referred to as "a wash box of the kind specified") essentially in the form of a vessel divided vertically into a stratification compartment and a reject compartment, with a perforate grid plate extending across upper parts of the compartments. The vessel is filled to a level above the grid plate with a liquid, such as water, and the raw material is deposited on the grid plate at one side, flow of water across the grid plate tending to carry the material across the grid plate.

Means is provided to cause generally vertical pulsations in the liquid in the two compartments, disturbing the raw material on the grid plate, causing the heavy material (the shale) to sink to the bottom adjacent to the grid plate, and the lighter material to rise to the top. Thus, as the raw material moves across the grid plate, and in particular across that part of the grid plate extending over the stratification compartment, the raw material is stratified. The heavier material adjacent to the grid plate falls from the grid plate into a reject extraction chamber, and the light material passes over a gate or sill (located a short distance above the grid plate) and from the wash box through a primary outlet.

It is desirable in wash boxes of the kind specified to be able to control the operation of the wash box as accurately as possible, and preferably by means which permits the utilisation of automatically operating mechanisms.

For example, in such wash boxes, it is necessary to control the thickness of the layer of the heavier material on the grid plate in the stratification compartment so as to ensure reliable separation of materials. If the layer of the heavy material becomes too thick, particles of the heavier fraction will pass out with the lighter material over the gate or sill. Conversely, if the layer of the heavier material is too thin, particles of the lighter fraction will be discharged into the reject extraction chamber with the heavier material.

Thus, it has been proposed in a wash box of the kind specified to sense the thickness of the layer of the heavier material in the stratification compartment and, when a reduction in the thickness of this layer is required, to cause pulsations in the liquid in the reject compartment, or to increase the amplitude of the pulsations being applied thereto, so that the particles of heavier material will pass over the grid plate and fall therefrom into the reject chamber more readily.

Conventionally the thickness of the layer of heavier material on the grid plate has been measured by the use of a float which rests on the top surface of the heavier material, and the position of the float has been used to control the pulsations applied to the reject compartment.

Additionally, since the pressure which is generated in the stratification compartment will be dependent upon the weight of raw material resting on the grid plate, proposals have also been made to connect a vertical tube to the stratification compartment from beneath the grid plate, into which liquid from beneath the grid plate flows, and to sense the mean or average position of the surface of the liquid within this tube by the use of mechanical means which includes a float in the tube, thereby providing an indication of the thickness of the layer of the heavier material. Thus, the position of the float may be used to control the amplitude of the pulsations applied to the reject compartment.

Alternatively, electrodes within such a tube have been used to sense when the level of the liquid within the tube rises to a predetermined point (corresponding to an undesirably high thickness of heavier material on the grid plate) to cause an increase in the amplitude of the pulsations applied to the reject compartment, or to sense when the level of liquid within the tube falls below a predetermined point (corresponding to an undesirably small thickness of the heavier material on the grid plate) to cause a decrease in the amplitude of the pulsations applied to the reject compartment.

Whereas all previous suggestions have been to varying extents satisfactory in the past, they do not readily lend themselves to the solution of problems now being encountered in the field of materials separation, particularly as it concerns the mining of coal.

Thus, when coal was extracted manually from the face being worked, the raw material would contain a relatively small proportion of reject materials of a heavier density, for example, ten percent of the raw material would be shale. However, even with the use of coal cutting machinery, until recently coal seams which have been worked have been relatively thick, and of a reliable nature. Thus, it was possible to use the coal cutting machine in a manner such that the proportion of reject materials of heavier density cut from the face with the coal was still relatively small, although usually higher than the figure which was obtained with manual extraction.

However, there is in present times a tendency to work seams of decreasing reliability, involving at times the cutting of predominantly reject material, and to work seams of shallower depth, and/or over and undercutting to an extent which ensures that all the coal is removed, despite the increase in reject material which will necessarily be produced at the same time.

Thus, not only is the reject content of the raw material becoming increasingly higher (often up to seventy percent) but also the proportion of reject material may vary considerably over relatively short periods of time.

Present techniques for controlling the operation of wash boxes of the kind specified have heretofore become insufficiently accurate, and have produced difficulty in ensuring that a minimum of reject material is included in the coal, and in ensuring that a minimum of coal is included in the reject material.

SUMMARY OF THE INVENTION

According to this invention there is provided a wash box of the kind specified, also comprising a pipe extending out from the stratification compartment and upwardly therefrom, the wash box comprising control mechanism responsive to the level of water in said pipe and thus to the pressure within the stratification compartment, said control mechanism comprising an emitter mounted on the pipe for emitting a beam along the pipe towards the water therein, the beam travelling along the pipe and being reflected from the surface of the water therein; a receiver also mounted on the pipe and which is responsive to the reflected beam; and an output device connected or adapted to provide an output signal dependent upon the time taken for the beam to travel from the emitter to the receiver.

Thus, a means of determining the weight of raw material on the grid plate is provided which is sufficiently sensitive to enable fine control over the operation of the wash box.

For example, the output signal may be used to control the pulsations applied to the reject compartment. In this manner, if the weight of raw material on the grid plate in the stratification compartment increases (indicating an increase in the quantity of reject material present on the grid plate) the pulsations applied to the reject compartment may be increased in frequency or magnitude, increasing the rate of removal of reject material from the grid plate into the reject extraction chamber, decreasing the possibility of reject material being carried out with the desired material (e.g. coal) from the primary outlet. Conversely, if the weight of raw material on the grid plate in the stratification compartment decreases (indicating a decrease in the quantity of reject material present on the grid plate) the pulsations applied to the reject compartment may be decreased, decreasing the rate of removal of reject material from the grid plate into the reject extraction chamber, decreasing the possibility of the desired material (e.g. coal) falling from the grid plate into the reject extraction chamber.

In such circumstances the control mechanism preferably comprises a control device interposed between the output device and said means, and which is adapted to vary the relationship between the value of the output signal and the value of the pulsations applied to the reject compartment under the control of the output signal. In this manner, the quality of the output material may be varied, for example between a high limit in which no or practically no inferior material is included in the material delivered from the primary outlet, and a lower limit in which a small quantity of inferior material will be included in the output material. Such fine control of the wash box is particularly important inasmuch as it enables a maximum separation efficiency, to the limits of the requirements of the ultimate users of the output material.

Alternatively or in addition, the output signal provided by the output device may be used to control operation of feed control means, to vary the rate at which raw material is fed on to the grid plate. Thus, whilst an increase in the output signal may indicate an increase in the proportion of reject material deposited on to the grid plate above the stratification compartment, it may indicate an increase in the total thickness of the raw material on the grid plate. Thus, where an unusually large output signal is produced by the control mechanism (for example one which would correspond to the maximum capability of application of pulses to the reject compartment) it may be desirable to slow down or cease the feed of raw material to the wash box. Conversely, where an unusually small output signal is produced by the control mechanism (for example one which would correspond to the zero application of pulses to the reject compartment) it may be desirable to increase the rate of feed of the raw material to the wash box.

Alternatively or in addition, the output signal provided by the output device may be used to perform various safety functions. Thus, where the wash box is a compound wash box, comprising two stratification compartments and a reject compartment associated with each stratification compartment, a pipe extending out from each stratification compartment and upwardly therefrom and the wash box comprising two such control mechanisms, one associated with each such pipe, each being used to control the pulsations applied to its associated reject compartment independently of the other, where the output signal provided by the two control mechanisms diverge from each other by more than a predetermined magnitude, an alarm may be energised.

For example, if the reject extraction chamber associated with the second reject compartment becomes blocked, the magnitude of the output signal provided by the control mechanism of that section would increase, due to an accumulation of reject material in the stratification compartment of that section. Thus, at a predetermined safety level, an alarm signal could be sounded which would result in the necessary action being taken by supervising personnel.

The beam emitted by the emitter along the pipe is conveniently in the form of discrete pulses, the output device providing an output signal dependent upon the time taken for each pulse to travel from the emitter to the receiver. The beam may be of electromagnetic radiation, but in view of the small distances involved, more conveniently the beam is of high frequency sound radiation.

To obtain a high accuracy of control, advantageously the frequency at which pulses are emitted by the emitter is several times the frequency at which pulsations are applied to the water in the stratification compartment. Thus, whilst each pulse is being applied to the stratification compartment, the output device will produce several output signals whilst the water level in the pipe first increases, and then decreases. Thus, the control mechanism is advantageously provided with a selection device which is operative in a manner such that the output signal provided by the output device is that which corresponds to the maximum height of water detected in the pipe in each cycle of pulsations applied to the stratification compartments.

Conveniently both the emitter and the receiver are provided by a vibrating member such as a Piezo-electric device, the control mechanism comprising means to cause the Piezo-electric device to vibrate, causing it to act in an emitting mode, and means to sense vibrations induced in the Piezo-electric device when acting in its receiving mode.

According to this invention there is also provided a wash box of the kind specified wherein a pipe extends out from the stratification compartment and upwardly therefrom, the wash box comprising control mechanism responsive to the level of water in said pipe and thus to the pressure within the stratification compartment to control the pulsations applied to the reject compartment in a manner dependent upon the weight of raw material on the grid plate in the stratification compartment, wherein the frequency at which the pulsations are applied to the reject compartment is a multiple greater than one (conveniently three times) the frequency at which the pulsations are applied to the stratification compartment, and the control mechanism is continually responsive to the level of water in the pipe whilst pulsations are being applied to the stratification compartment, said control mechanism comprising an output device adapted to provide an output signal dependent upon the maximum level reached by the water in the pipe for each such pulsation, and the wash box comprising valve mechanism responsive to the output signal provided by the output device to vary the pressure of the pulsations applied to the reject compartment.

Previously in wash boxes of the kind specified, the same conveyor means has been used to discharge both the larger pieces of the heavier, reject material which pass over the edge of the grid plate into the reject extraction chamber, and also the smaller pieces of the heavier reject material which pass through the apertures in the grid plate and which fall to the bottom of the stratification and reject compartments. Thus, conventionally a bucket elevator has been used to discharge both the larger and smaller pieces of the reject material and this elevator has extended from a location below the bottom of the stratification and reject compartments to its discharge point above the upper level of liquid in the vessel. This elevator has therefore had a long travel in a vertical sense and has thus required a long casing which must be watertight to a level above the upper level of liquid in the vessel. This causes practical problems when such an elevator requires repair or servicing, since in order to obtain access to the elevator it is necessary to drain the wash box, which is a time consuming operation owing to the appreciable amount of water therein.

Additionally it has been necessary for the elevator to be of a size sufficient to raise both the larger and smaller pieces of the heavier fraction from this location. This has necessitated a relatively large and expensive elevator construction.

According to another aspect of this invention there is provided a wash box of the kind specified, wherein a first conveyor means is provided for moving the material which passes over the edge of the grid plate into the reject extraction chamber to a discharge point above the level of liquid in the vessel, and a second conveyor means is provided for moving the material from the outlets at the bottom of the stratification and reject compartments to a discharge point above said upper level of liquid.

Thus, since in the wash box separate conveyor means are provided for the larger pieces of heavier material which fall over the edge of the grid plate and for the smaller pieces of the heavier material which pass through the apertures of the grid plate, it is possible to arrange the first conveyor means which discharges the larger pieces to be located at a relatively high level, for example not lower than the top half of the wash box. Thus, when it is necessary to repair or service the first conveyor means which discharges the larger pieces, access to this conveyor is much quicker and simpler since the head of water which must be discharged in order to drain the conveyor casing is greatly reduce. Additionally, since it is the larger pieces of the heavier material which are most likely to damage the conveyor means or to cause wear, further benefits in reduction of maintenance time are obtained by employing the arrangement in which the first conveyor means is so readily accessible.

Further, since the volume of the smaller pieces of the heavier material which are discharged from the wash box is only a small fraction of the volume of the larger pieces of the heavier material discharged, it is possible to appreciably reduce the capacity (and thus the cost) of the second conveyor means since this is no longer required to discharge the larger pieces as well. For example, if the second conveyor means is in the form of a bucket elevator, it is envisaged that one whose buckets are of six to nine inches in width would be sufficiently large to discharge the smaller heavier reject materials, whereas a bucket elevator whose buckets are of three foot six inches in width is conventionally required to discharge both the larger and smaller pieces of the reject material.

In its most basic form, a wash box of the kind specified and as set out in the last preceding paragraph but two has only one stratification compartment, one reject compartment, and one reject extraction chamber.

However, further advantages may be gained where the wash box comprises two or more stratification compartments arranged in series with the reject compartment and the reject extraction chamber, the grid plate sloping across the upper parts of the stratification and reject compartments so that material fed into the wash box at the high end of the grid plate above one stratification compartment passes through the upper part of each stratification compartment in turn and either passes over the edge of the grid plate into the reject extraction chamber or leaves the wash box by way of the primary outlet for the lighter fraction. Most conveniently, the second conveyor means will move the material from the bottoms of the reject compartment and all the stratification compartments.

Further advantages may be gained where the wash box is a compound wash box comprising two or more grid plates, each grid plate being provided with its own stratification and reject compartments and reject extraction chamber. For example, two or more basic wash box units of the kind set out in the last preceding paragraph but four may be arranged in series to form a compound wash box as described hereinafter in detail.

Thus in a compound wash box there will be two or more extraction chambers for receiving the larger pieces of the larger heavier reject material, and each extraction chamber will advantageously be provided with a separate first conveyor means. It may however be possible to arrange for some or all of the basic wash box units which make up the compound wash box to share a common second conveyor means, thus reducing further the cost of the installation.

Preferably the extraction chamber of the wash box (or each extraction chamber if a compound wash box) is maintained open to atmosphere, and the (or each) extraction compartment is desirably provided with a first conveyor means arranged to extend therethrough, the (or each) first conveyor means having a conveying path part of which extends along the length of the edge of the associated grid plate at a level below said edge and which extends in a substantially horizontal direction, and a further part of which rises up to the discharge point.

It is the fact that the space above the liquid in the or each extraction compartment is maintained open to atmosphere which makes possible the use of the first conveyor means described in the last preceding paragraph, since if this space were to be air-locked under the control of a valve in order to control the pulsations in the adjacent reject compartment, it would not be possible to use such a first conveyor means in view of the difficulty in maintaining the space above the or each extraction chamber air-locked.

The first conveyor means described above having part of its conveying path extending substantially horizontally, lends itself to handling the materials which pass over the edges of two or more grid plates.

Thus, the invention also provides a wash box assembly comprising two or more wash boxes of the kind set out in the last preceding paragraph but nine, which share a common first conveyor means.

BRIEF DESCRIPTION OF THE DRAWINGS

The various aspects of the present invention will now be described, by way of example only, with reference to the accompanying drawings in which.

DESCRIPTION OF THE PREFERRED EMBODIMENT

The wash box which is the preferred embodiment of this invention is a compound wash box of the kind specified comprising a vessel indicated generally at 10 intended to contain water and through which a mixture of coal and shale passes, which is separated in the water. The mixture of coal and shale enters the vessel at one end through a chute 11 and the lighter material, which is at least predominently coal, leaves at the other end through a chute 12 providing a primary outlet for the coal.

Figure 1:
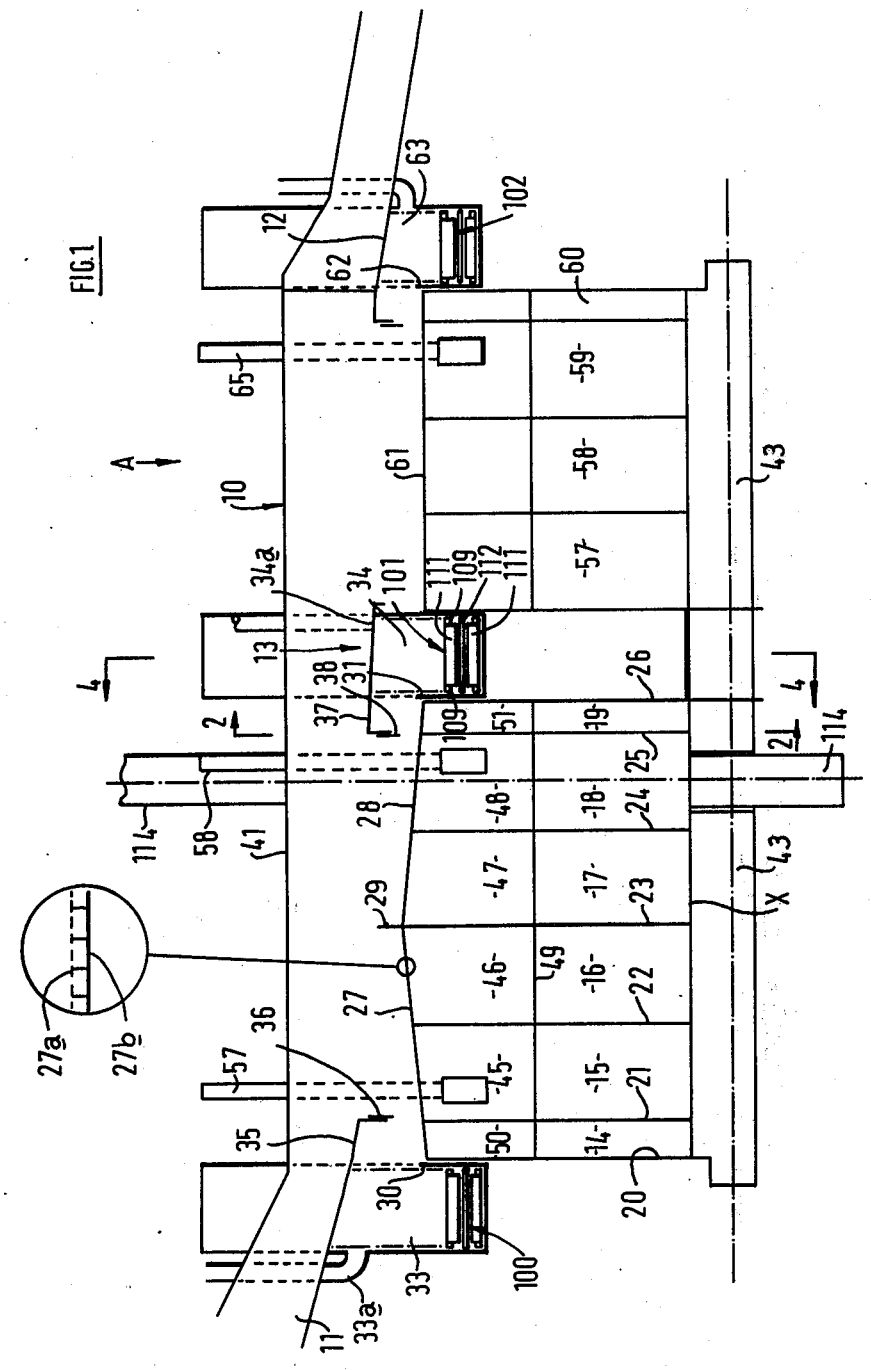
FIG. 1 is a longitudinal section through a wash-box embodying the invention.

The left side of the vessel is divided into six compartments 14–19 by walls 20–26, the wall 26 forming the lefthand wall of the dividing assembly 13 (see FIG. 1). The compartments 15–18 constitute stratification compartments whereas compartments 14 and 19 constitute reject compartments. Supported on the upper ends of the walls 20, 21 22 and 23 is a perforated grid plate 27 which slopes downwardly from the wall 23 to the wall 20. Similarly a perforated grid plate 28 is supported on the upper ends of the walls 23, 24, 25 and 26 and which slopes downwardly from the wall 23 to the wall 26. The wall 23 has an upper end portion 29 which extends above the grid plates 27 and 28. Both grid plates comprise a framework 27b supporting sheet mesh 27a. At its lefthand end the grid plate 27 has a weir plate 30 and at its righthand end the grid plate 28 has a weir plate 31. Advantageously, the weir plates are adjustable in height. A downwardly extending reject extraction chamber 33 leads from behind the weir plate 30 (on the left side, FIG. 1) and a downwardly extending reject extraction chamber 34 leads from behind the weir plate 31 (on the right side, FIG. 1). The lefthand end of the grid plate 27 if overhung by a feed sill 35 having an adjustable gate member 36. Similarly, the righthand end of the grid plate 28 is overlapped by an outlet sill 37 having an adjustable gate member 38.

Similarly, the right side of the vessel is divided into four compartments 57–60, constituting three stratification compartments (57, 58, 59) and a reject compartment (60). Extending above these compartments is a perforated grid plate 61. At its righthand end, the grid plate 61 is provided with a weir plate 62, over which material may flow from the grid plate into a reject extraction chamber 63.

The compound wash box which is the preferred embodiment of this invention thus comprises three basic wash box units of the kind specified, arranged in series, one unit being provided by the reject extraction chamber 33, the reject compartment 14 and the stratification compartments 15 and 16, a second unit being provided by the stratification compartments 17 and 18, the reject compartment 19 and the reject extraction chamber 34, and the third unit being provided by the stratification compartments 57, 58 and 59, the reject compartment 60 and the reject extraction chamber 63.

Figure 2:
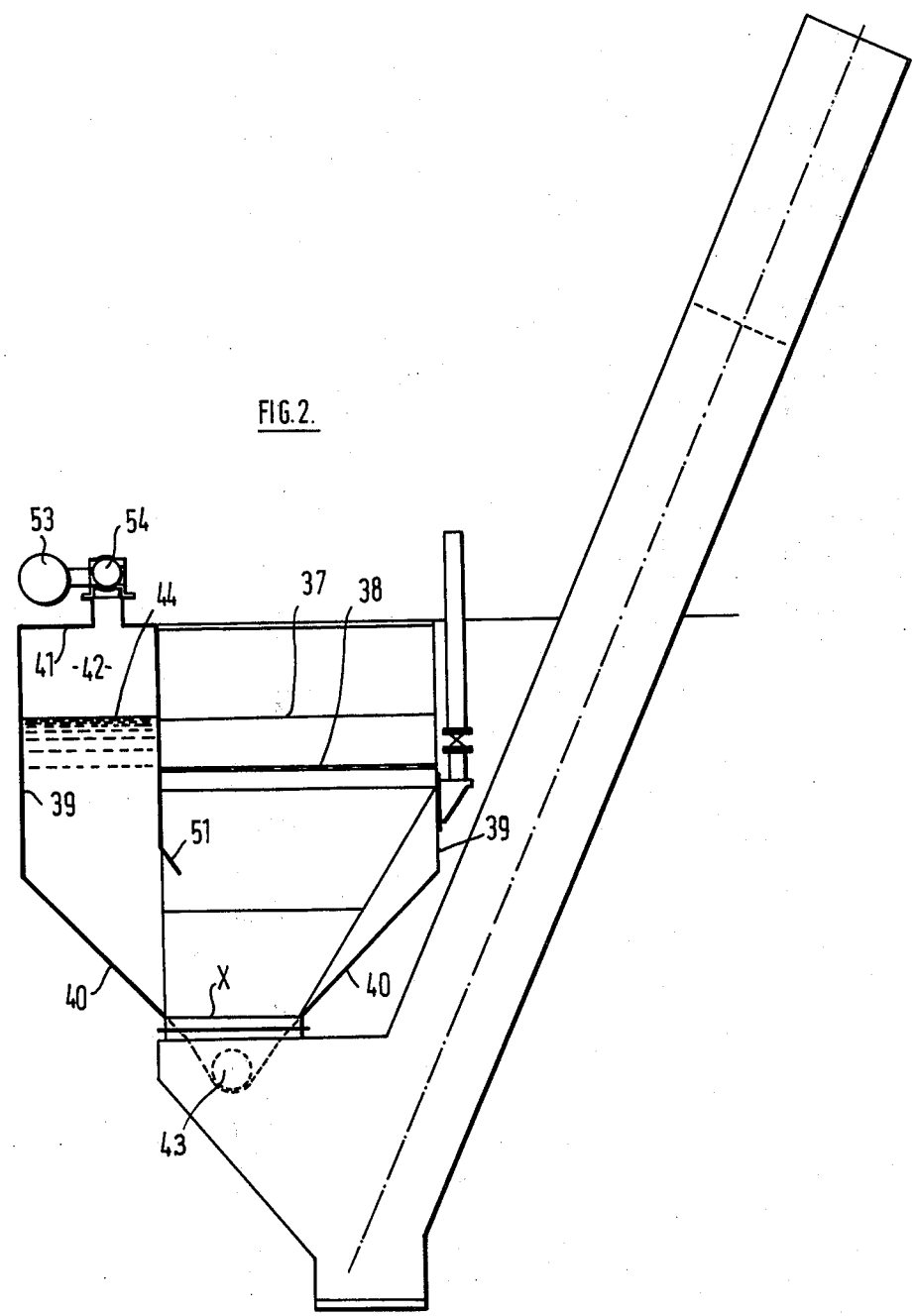
FIG. 2 is a section on the lines 2—2 of FIG. 1.

The vessel has vertical side walls 39 and converging bottom walls 40 (see FIG. 2). Extending inwardly from the lefthand side wall 39 is a cover plate 41. Between each pair of adjacent walls 20,21: 21,22: 22,23: 23,24: 24,25: 25,26 partition plates 50: 45: 46: 47: 48: 51 extend, thus making each compartment of U-shaped cross-section as shown in FIG. 2. The partition plates co-operate with the cover plate 41 and in conjunction with the lefthand side wall 39, form a compression chamber at the top of the lefthand limb of each compartment, such as the chamber 42 of the compartment 19 in FIG. 2.

The water level in the vessel is indicated at 44. The walls 21 to 25 completely separate adjacent righthand limbs of the compartments from each other from below the grid plates to the lower edges of these walls indicated at X in FIGS. 1 and 2.

The compression chamber of each compartment is provided with a separate rotary valve 14'–19' and 57'–60' (see FIG. 3) which is connected to a compressed air conduit 53. These rotary valves are each arranged periodically to connect their respective compression chamber with the conduit 53 thus applying pressure to the water in the associated compartment. All the rotary valves 14' to 19' and 57' to 60' are driven from a common drive shaft 52, the valves 14', 19' and 60' being arranged to cause the water in the reject compartments 14 and 19 and 60 to pulsate at a frequency higher, e.g. twice or three times, than the frequency of pulsation of the water in the stratification compartments 15 to 18 and 57 to 59.

Additionally variable orifice valves 14", 19" and 60" are provided between the rotary valves 14', 19' and 60' and the compressed air conduit 53 to control the pressure of air supplied to the valves 14', 19, 60 in order to enable the amplitude of the pulsations applied to the compartments 14, 19 and 60 to be varied.

During the operation of the wash box, air under pressure is admitted into the compression chambers of the compartments 15 to 18 by the valves 15' to 18', and causes the water therein to pulsate. As the water pulsates, passing upwardly and downwardly through the grid plate, it stratifies the material delivered by the feed chute 11 as it passes over the grid plates 27 and 28 so that the lighter material, which in the separation of coal and shale will be the coal, passes over the outlet sill 37 whilst the heavier material, which will normally be shale, either settles on the grid plates 27 or 28 or, if too small to be supported, passes through the grid plates and falls to the bottom of the compartments where it is picked up by a screw conveyor 43. The shale on the grid plates 27 and 28 passes over the weir plates 30 and 31 into the extraction chambers 33 and 34 and is removed by conveyors indicated at 100 and 101 respectively.

Meanwhile, material comprising predominently coal passes over the outlet sill 37 and is deposited on to the grid plate 61, where it is once again stratified by the action of the water in the stratification compartments 57, 58 and 59, the shale falling predominently close to the grid plate, ultimately passing over the weir plate 62 into the reject extraction chamber 63, whilst coal and water passes through the primary outlet provided by the chute 12.

The level of the shale on the grid plate above the stratification compartment 15 is sensed by means of a pipe 57 extending outwardly from the stratification compartment, and upwardly therefrom. Since pressure is applied to the water in the stratification compartment from below, resistance to flow of water through the perforated grid plate will produce an increase in the pressure within the pipe 57, and thus the level which the water in the pipe reaches during each pulsation of the stratification compartment 15 will indicate the quantity of material, and in particular the quantity of heavier material, resting on the grid plate above the stratification compartment 15.

In the preferred embodiment, whilst the frequency of pulsations applied to the reject compartment 14 are fixed in relation to the frequency at which pulsations are applied to the stratification compartment 15, and are greater than the rate of which pulsations are applied to the stratification compartment, means is provided to enable the amplitude of the pulsations applied to the reject compartment to be varied, depending upon the quantity of material resting on the grid plate above the adjacent stratification compartment 15, and as indicated by the height reached by water within the pipe 57.

Similarly, control over the amplitude of the pulsations applied to the reject compartment 19 and 60 is excercised, in accordance with the quantity of material resting on the grid plate 28 above the stratification compartment 18, and on the grid plate 28 above the stratification compartment 59. For this purpose, a pipe 58 extends upwardly from the stratification compartment 18 and a pipe 65 extends upwardly from the stratification compartment 59.

Figure 5:
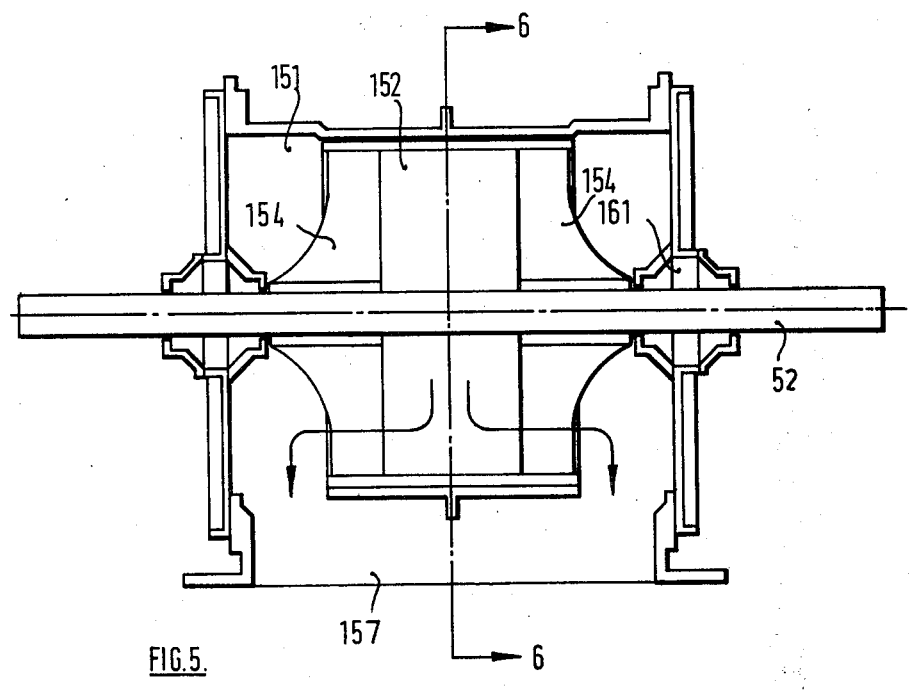
FIG. 5 is a radial section through an air valve of the wash box.
Figure 6:
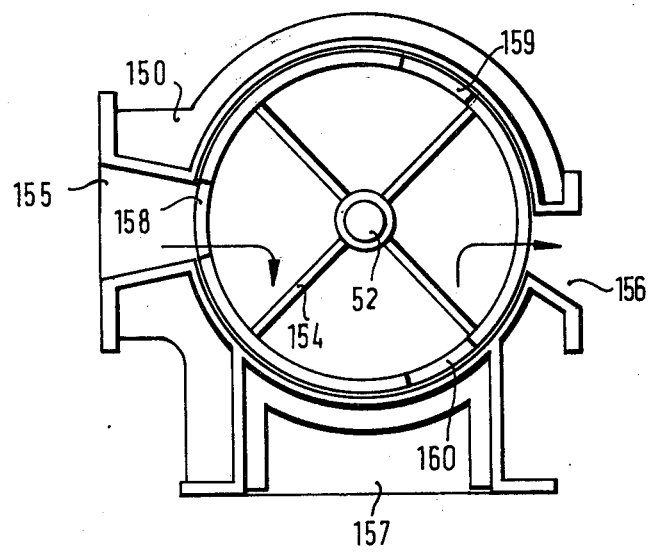
FIG. 6 is a section on the line 6—6 of FIG. 5.

The rotary air control valves 14′, 19′ and 60′, by which pulses of pressurised air are supplied to the compression chambers of the reject compartments 14, 19 and 60, are similar, and are illustrated in detail in FIGS. 5 and 6.

Each valve comprises a housing 150 having an internal chamber 151 in which a hollow cylindrical valve member 152 is mounted for rotation on the common shaft 52, which is rotatable through bearings 161 supported by the housing.

The chamber 151 is provided with an inlet port 155, an outlet port 156 and a delivery port 157 which is arranged to be connected with the compression chamber of the associated reject compartment. The valve member 152 is provided with three circumferentially spaced openings 158, 159 and 160. Each of these openings is arranged to register with the inlet port and the exhaust port in turn as the valve member is rotated.

The valve member is supported on the shaft 52 by two spiders 154 so that the ends of the valve member are open and, as can be seen from FIG. 5, the interior of the valve member is thus in permanent communication with the delivery port 157.

With the opening 158 in register with the inlet port 155 the interior of the valve member 152 and thus the delivery port 157 is connected with the pressurised air line 53 by way of the inlet port 155. A pulse of high pressure air is thus supplied to the associated compression chamber, the duration of this pulse being dependant on the speed of rotation of the valve member and the size of the opening 158.

With the valve member rotating clockwise as viewed in FIG. 6, the opening 158 will move from register with the inlet port 155 so that pressurised air is no longer supplied to the delivery port 157. After the connection between the opening 158 and the inlet 155 has been closed, the opening 159 registers with the exhaust port 156 so that the pressurised air in the compression chamber can be exhausted to atmosphere by way of the hollow interior of the valve member 152.

The opening 160 will next register with the inlet port 155 thus again connecting the delivery port 157 with the pressurised air supply. Next the port 158 will register with the exhaust port 156 again connecting the delivery port with the exhaust port.

The sequence of operation of the valve is completed by the opening 159 registering with the inlet port 155 and the opening 160 registering with the exhaust port 156.

Thus during each rotation of the valve member 152 the delivery port 157 is connected three times to the inlet port 155 and three times to the exhaust port 156.

The number of pulsations of pressurised air which the valve supplies per revolution can readily be altered by varying the number of openings in the valve member. For example, two, four or five pulsations per revolution could be provided by employing two, four or five openings in the valve member.

The compression chambers of the stratification compartments of the wash box shown in FIGS. 1 to 4 are supplied with air under pressure by valves 15′–18′ and 57′ to 59′ of the general form shown in FIGS. 5 and 6 but having fewer openings. Thus, in the preferred embodiment, the frequency of pulsations of the air applied to the reject compartments is higher than the frequency of the pulsations of the air applied to the stratification compartments.

Since the rotary control valves for the various reject compartments and stratification compartments are rotated at the same speed by the common drive shaft 52, the frequency at which pulsations are applied to the compression chambers of said compartments is maintained in strict relationship. In particular, in view of the construction of control valves preferably used, the frequency at which pulsations are applied, say, to the compression chamber of the reject compartment 14, is an integral multiple greater than 1 of the frequency at which the pulsations are applied to the compression chamber of the stratification compartment 15 associated with said reject compartment 14.

In use, the valves 15′ to 18′ and 57′ to 59′ will normally be arranged to pulsate the stratification compartments 15 to 18 and 57 to 59 at the same frequency.

Additionally, since all the valves are fed from the common air line 53, the pressure at which the various valves apply pulsations to the various compartments may be equal, but may be varied by the operation of hand-valves.

The compound wash box which is the preferred embodiment of this invention comprises, for each of the pipes 57, 58 and 65, a control mechanism operative, inter alia, to control the amplitude of the pulsations applied to the reject compartment associated with the stratification compartment from which said pipe extends. The three control mechanisms are similar, and for simplicity, only one will now be described.

Basically, the control mechanism comprises an emitter for emitting a beam in wave form along the pipe towards the water therein, the beam travelling along the pipe and being reflected from the surface of the water therein, and a receiver responsive to the reflected beam. Conveniently, the beam is transmitted in the form of short, discrete pulses.

The control mechanism also comprises a timing device for measuring the time interval between the instant of transmission and the reception of the echo reflected from the air/water boundary, and an output device adapted to provide an output signal dependent upon said time.

Whilst the beam may be of electromagnetic radiation, in view of the short distances involved, more conveniently the beam is in the form of high frequency sound radiation. Additionally, for convenience, both the emitter and the receiver are provided by a single ultrasonic transducer, conveniently in the form of a Piezo-electric crystal, which when energised acts as a transmitter, and which is capable of vibrating in response to the echo, means being provided to sense the vibrations induced in the transducer, when acting in this mode.

The control mechanism associated with the pipe 57 will now be described, but it is to be understood that similar control mechanisms will be mounted on the pipes 58 and 65.

Figure 9:
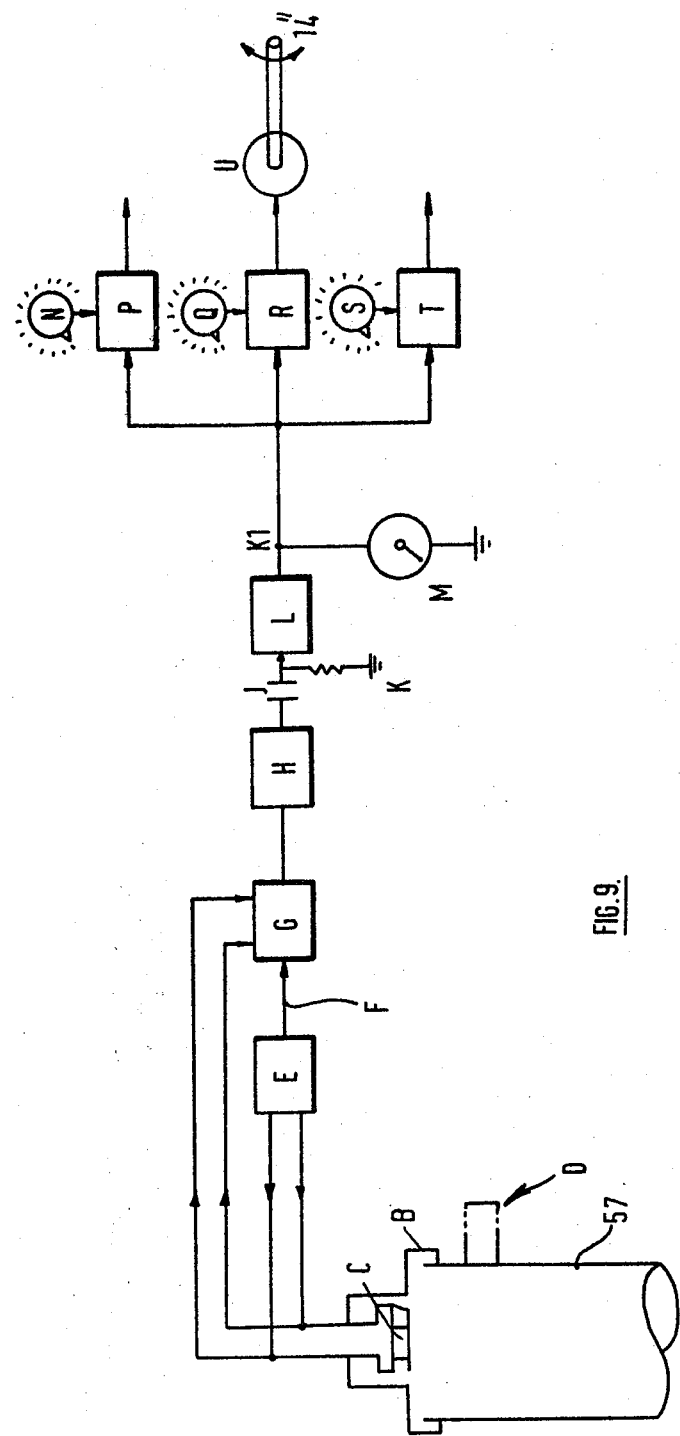
FIG. 9 is an enlarged view, illustrating schematically one of the control mechanisms of the preferred embodiment.

The upper end of the pipe 57 is closed by a cap B which carries an ultrasonic transducer C (see FIG. 9). To avoid ingress of dust whilst avoiding compression of air within the pipe, a breather tube having an air filter D is provided. The transducer C is cut from a plate of Piezo-electric material having a natural resonant frequency of approximately 40 kilo-hertz. The crystal is provided with electrodes on its parallel faces to facilitate connection to an external electric circuit.

The control mechanism comprises an oscillator E designed to apply to the transducer a continuous train of narrow voltage pulses, typically of one microsecond duration, and at a repetition rate determined by calculation of the maximum distance to be measured and the velocity of sound in air. Each pulse applied to the crystal causes the transducer to resonate briefly, and to propogate a small pulse of acoustic energy through the air in the pipe 57 towards the water. On meeting the air/water boundary, a proportion of the transmitted energy is reflected back up the pipe, at its original velocity, and on impinging on the transducer is converted back into a small electrical pulse.

For the purpose of measuring the transit time to and from the water surface, each pulse transmitted from the oscillator E is also made to switch a bi-stable element in the receiver G through a connection line F. The returned pulse is amplified in receiver G, and reswitches the bi-stable element. Thus, the time during which the bi-stable element is in its "switched" condition is equal to the transit time of the pulse of energy to and from the water surface. Thus, the output from the receiver G will be in the form of a square wave pulse having a mark:space ratio proportional to the instantaneous height of water in the pipe 57. Since the oscillatory movement of the water in the pipe 57 is approximately sinusoidal, the change in mark:space ratio of a sequence of pulses emitted from receiver G will also be approximately sinusoidal.

The square wave pulses emitted by receiver G are fed to a converter H which integrates the area bounded by the positive part of pulses fed to it. Thus, the converter H generates a sinusoidal voltage wave form whose peak to peak amplitude is proportional to the peak height of water in the pipe 57.

The rate at which the tranducer transmits pulses into the pipe 57 is greatly in excess of the frequency at which pulsations are applied to the stratification compartment 15, and since the quantity of material on the grid plate 27 above the compartment 15 controls the maximum pressure occurring within the compartment 15, it is necessary to measure the peak height reached by the water within the pipe 57.

Figure 10:
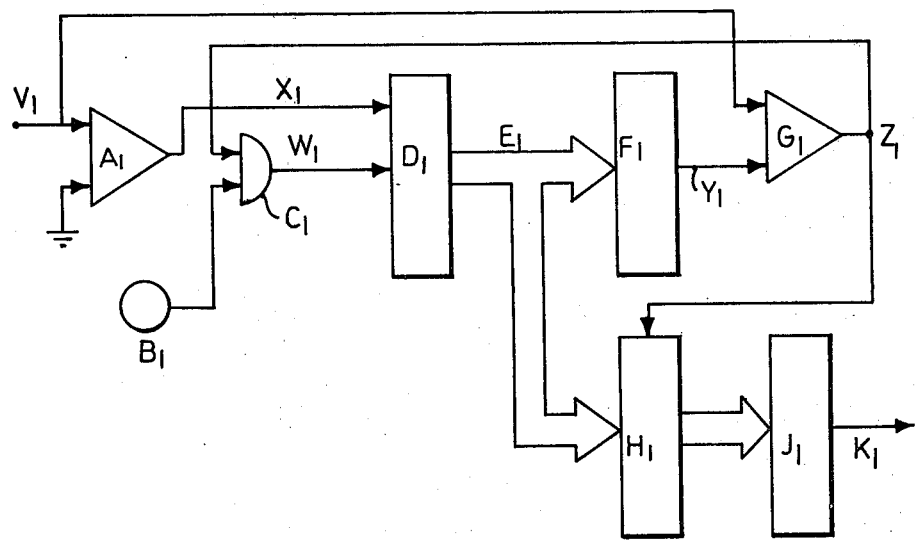
FIG. 10 is a detailed view of an element illustrated in FIG. 9.
Figure 7:
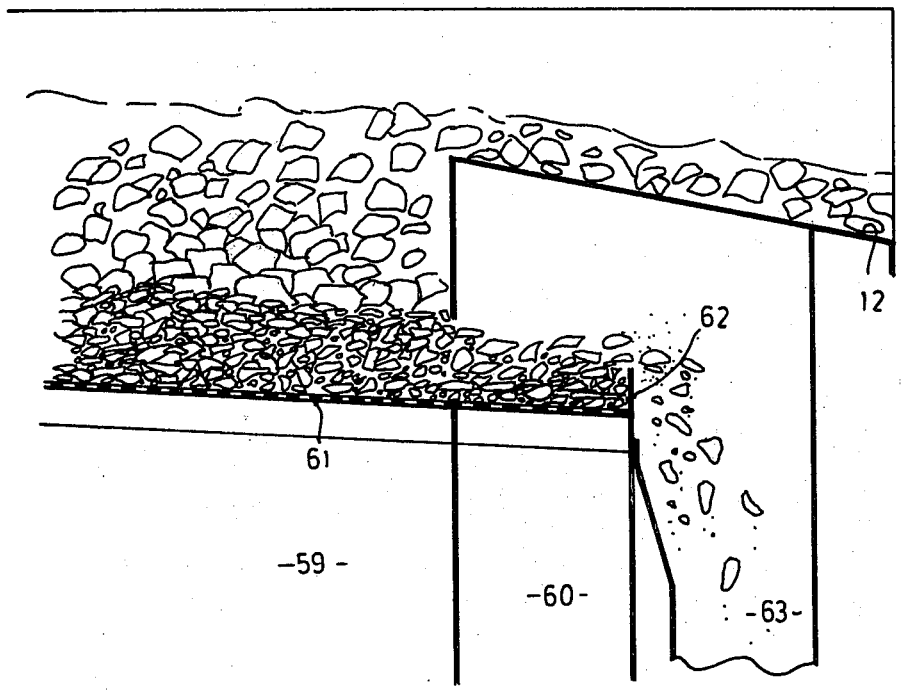
FIG. 7 is an enlarged view, illustrating schematically heavier material passing from the grid plate into a reject extraction chamber, and the lighter material passing from the wash box through a primary outlet.
Figure 8:
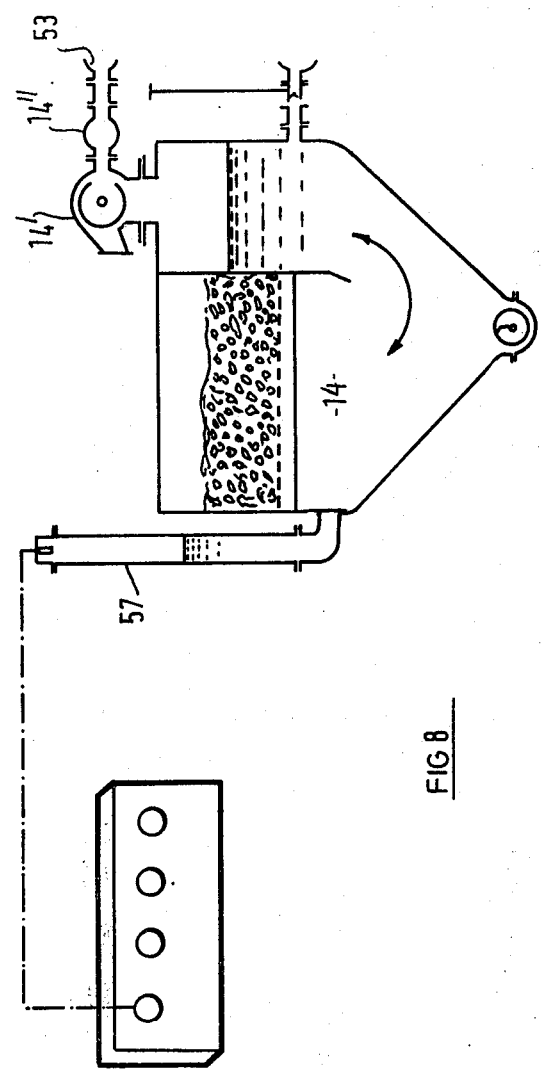
FIG. 8 is a schematic side elevation, illustrating an operational control of the wash box.

To effect this, the output from the converter H is fed to a capacitor J, whose second terminal is connected to a point of zero potential through a resistor K. The values of capacitance and resistance are chosen such that there is no atenuation of the sound wave over the range of frequencies encountered. The second terminal of capacitor J is also connected to a box L, shown in more detail in FIG. 10.

The alternating voltage at the second terminal of capacitor J is applied, through line V1 to one terminal of a differential comparitor A1, referred on its second input to zero potential. As long as the input voltage is negative with respect to zero potential, the comparitor has a logical 0 at its output which, through line X1, disables a binary counter D1. At the instant when the input to A1 becomes positive with respect to zero potential, line X1 switches state from logical 0 to logical 1 and initiates operation of the binary counter D1.

An oscillator B1 receives clocks pulses through AND gate C1, which clock pulses are counted by the binary counter. The frequency of the oscillator B1 and the number of stages in the counter are determined by the resolution required, N binary stages giving a resolution 2 to the N−1 digits. An output from each counter stage is taken to a weighted resistor network F through multiple lines E, the network being supplied from a source of constant voltage and being arranged so that the voltage developed across the network is a linear function of the binary number in the counter. The voltage output from the resistor network is taken to one input of a second differential comparitor G1 through line Y1, the second input of the comparitor G1 being the zero referred sign wave fed to the comparitor A1. As long as the voltage on V1 is more positive than the output from F1, comparitor G1 has logical 1 at its output, maintaining the AND gate C1 open and maintaining an increasing count in D1.

At the peak of the voltage sign wave however, the voltage commences to decrease so that line V1 becomes less positive than F1 output, which causes G1 to change state at its output to logical 0. This action closes AND gate C1, preventing further counting by the counter D1, and also opens digital latches of box H1.

Box H1 contains the same number of latches as there are counter stages in the binary counter D1, and when these are opened, the box H1 assumes the logical states on the counter outputs, providing a memory. A second weighted resistor network J1, which is identical to the network F1, is connected to box H1 and produces an output voltage on line K1 which is equal to the peak value of the sign wave.

At the instant when line B1 becomes negative, comparitor A1 reverts to its original state, the logical 0 at its output resetting counter D1, but because the latches of box H1 are unaffected, the peak value continues to be present at K1. Thus, during each sign wave cycle, the peak value is determined and held until updated during succeeding cycles.

It will be noted that the peak amplitude of only one half of each cycle is measured, but this is permissible since the symmetry of the positive and negative halves is equal.

Advantageously, a suitably calibrated meter is connected to line K1, to indicate the peak height attained by the water in the pipe 57. Additionally, line K1 is connected to a comparitor R, which is also referred to a calibrated voltage source Q, the latter being set such that the reference voltage is equal to the desired peak movement of water in the pipe 57, and consequently at the desired weight of raw material on the grid plate 27 above the stratification compartment 15.

At equality, when the voltage on line K1 equals the reference from source Q, the output of the comparitor R is zero, and no alteration to the pulsations applied to the reject compartment 14 is effected. However, when the voltage on K1 becomes more positive than the reference, a positive output from R to servo-motor U causes the servo-motor to drive the variable orifice valve 14″ (FIG. 9) increasing the pressure at which air is delivered to the rotary valve 14′, and causing the amplitude of the pulsations applied to said reject compartment to increase comensurately, causing movement of shale across the grid plate 27 from right to left (FIG. 1) more quickly, increasing the rate at which shale is fed over the weir plate 30 into the shale extraction chamber 33.

Conversely, a decrease in the voltage on line K1 produces a negative output from R, which causes the servo-motor U to close the valve 14″, causing a comensurate reduction in the amplitude of the pulsations applied to the reject compartment 14, decreasing movement of shale across the grid plate 27, and decreasing the rate at which such shale is fed into the extraction chamber 33.

The control mechanism also comprises means to prevent overloading from occuring, in the event that the shale content of the incoming raw material is considerably high, and/or the rate at which the raw material itself is delivered into the wash box is unduly high. For this purpose, the control mechanism comprises a comparitor P which has as its reference source a voltage N set to be considerably higher than that derived from Q, so that when the voltage on line K1 exceeds N, comparitor B switches external mechanism to reduce the rate of input of raw material into the wash box, or if necessary to terminate such feed, and if desired to sound an alarm.

Additionally, the control mechanism comprises means to minimise under-utilisation of the wash box in the event that the shale content of the raw material is small, and/or the rate at which raw material is fed into the wash box is reduced. For this purpose, a comparitor T is provided which has as its reference a voltage derived from a source S, which is set at a level lower than that of Q, so that a decrease in the peak water level below that which indicates a lower level of utilisation of the wash box causes comparitor T to switch external apparatus to increase the input, and/or to sound an alarm.

In the event that it is desired to vary the desired level of shale on the grid plate (for example if higher or lower qualities are required of the output material) the reference signal supplied by Q may be varied. Similarly, the reference signals supplied by sources N and S may also be varied.

Conveniently, means is provided for comparing the output signal at comparitor R of the three control mechanisms, so that in the event of a divergance in the comparative levels of these beyond, for example, a predetermined level, an alarm signal would be sounded. Such a divergence may be caused by e.g. a blockage of the path for the reject material into the shale extraction chamber 34 or the shale extractor chamber 63.

During operation of the compound wash box, the larger pieces of reject material fall over the weir plates 30, 31 and 62 into the reject extraction chambers defined by the conveyors 100, 101 and 102. These three conveyors are substantially identical in construction, differing if desired in size, and only the central conveyor 101 will be described in detail.

Figure 3:
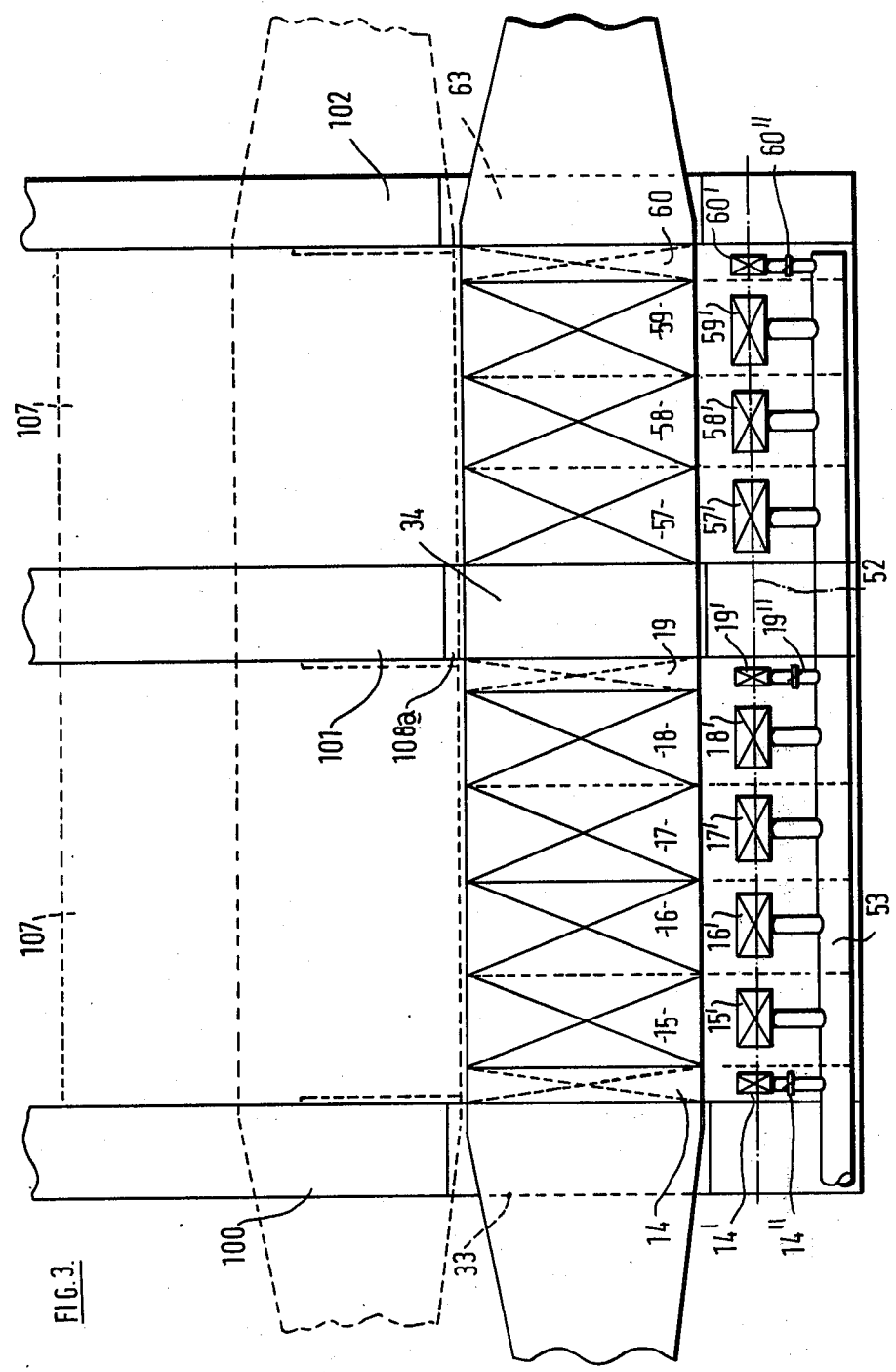
FIG. 3 is a plan view in the direction of the arrow A of FIG. 1 on a reduced scale.
Figure 4:
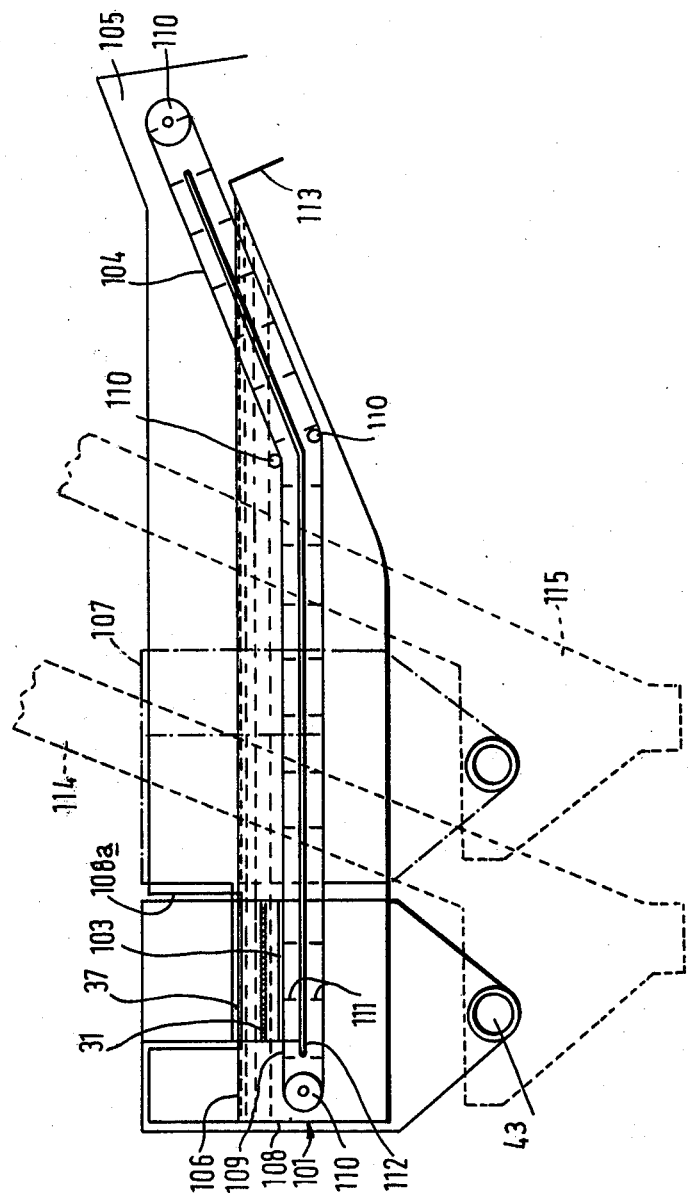
FIG. 4 is a section view on the line 4—4 of FIG. 1.

Referring to FIG. 4, the conveyor 101 has a conveying path with a substantially horizontal part 103 which is positioned below the weir plate 31 and which extends substantially parallel thereto, and a further part 104 which rises up to a discharge point 105 which is above the upper level of liquid in the washbox which is indicated at 106 in FIG. 4. The horizontal part of the conveying path as shown in FIG. 4 is in fact sufficiently long to enable a second compound wash box shown in dotted outline 107 in FIGS. 3 and 4 to discharge onto the same horizontal part of the conveyor 101. If only the washbox shown in full lines in FIGS. 3 and 4 is to discharge onto the conveyors 100, 101 and 102 then the horizontal parts of the conveyors will be reduced appropriately in length.

The conveyor 101 comprises a casing 108 which contains water up to the level 106. The casing is stepped at 108a to pass under the outlet sill 37. The sides and base of this step are closed and water-tight, the remainder of the top of the casing being open. If a second washbox 107 is to be used (this would be placed in a back-to-back relationship with the washbox shown in full lines in FIGS. 3 and 4) then the size of the step 108a will be enlarged accordingly.

Inside the casing 108 two continuous chain loops 109 are provided which are supported on appropriate sprockets 110. Between these two chain loops scraper blades 111 are supported so as to provide a conventional scraper-type chain conveyor.

The top run of the conveyor is arranged to be the live conveying run and the material which is discharged over the weir plate 31 falls onto a division plate 112 provided in the casing 108 which extends along the entire length of the conveyor to the discharge point 105 and along which the material is dragged by the plates 111. When the material reaches the discharge point 105 it is discharged from the conveyor via a chute outlet 113 onto a further conveyor (not shown) which receives the outlets from all the conveyors 100, 101 and 102.

On the return run of the conveyor the scraper blades travel beneath the division plate 112 as can be seen from FIGS. 1 and 4.

In the washbox arrangement shown in FIGS. 1 to 4 the smaller pieces of the heavier fraction of the material are conveyed from the bases of the reject and stratification compartments 14 to 19 and 57 to 60 using two screw conveyors 43, rotating in opposite directions which are arranged to discharge onto a single substantially central elevator means 114. The elevator means may be in the form of a bucket elevator, but may be of other form, e.g. an air lift or pump. Since the volume of material which is discharged from the bases of the reject and stratification compartments is only a small fraction of the total of the reject material discharged from the washbox, this central elevator means 114 can be of an appreciably smaller capacity than is conventionally used.

As will be evident from the above description the cost saving in the installation is greatly increased by arranging two or more compound washboxes to discharge onto the same conveyors as shown in dotted detail 107 in FIGS. 3 and 4. If such an arrangement is adopted the additional washbox 107 would require one further elevator, corresponding to elevator means 114, again of small capacity, shown in dotted detail 115 in FIG. 4.

In addition to the chain scraper type of conveyor described above the conveyors 100, 101 and 102 could be of belt or bucket type but their general conveying path would be of the form shown in FIG. 4 thus allowing several washboxes to discharge onto the same conveyor.

Alternatively, if desired, the horizontal part of the conveying path could be provided by a ram arranged to have a horizontal travel during which it pushes the discharged material onto a separate conveyor which carries the material to a level above the liquid in the washbox. This horizontal transportation could also be carried out by a vibrating conveyor.

In these alternative arrangements several washboxes could similarly be arranged to discharge onto the horizontal part of the conveying path thus obtaining the previously referred to economy of installation.

We claim:

1. A method of controlling the operation of a wash box in the form of a vessel divided vertically into water containing compartments and having a perforate grid plate extending across upper parts of the compartments, means being associated with the vessel which is operative to apply pulsations to the water in the compartments to produce a cyclic rise and fall of liquid in the compartments, said method involving the steps of:
   (a) transmitting wave energy towards the surface of the liquid in one of said compartments;
   (b) receiving a reflected signal therefrom;
   (c) comparing a function of the transmitted signal with a function of the received signal to derive a comparative value;
   (d) acting arithmetically upon successive comparative values to derive an output signal; and
   (e) utilizing said output signal to control the operation of the wash box.

2. A method of controlling the operation of a wash box in the form of a vessel divided vertically into water-containing compartments and having a perforate grid plate extending across upper parts of the compartments, means being associated with the vessel which is operative to apply pulsations to the water in the compartments to produce a cyclic rise and fall of liquid in the compartments, said method involving the steps of:
   (a) repeatedly transmitting signals toward the water in one of the compartments, said signals being reflected from the surface of the water;
   (b) receiving the reflected signals;
   (c) measuring the period of time between the transmission and reception of each signal;
   (d) operating arithmetically on the measured periods of time to produce an output signal which is dependent on the change in the mean level of water in the said one compartment; and
   (e) using the output signal to control the rate of discharge of material from the grid plate of the wash box.

3. A method according to claim 2 wherein said signals are transmitted towards the surface of the water in a pipe extending out from said one compartment and upwardly therefrom.

4. A method according to claim 2 wherein the output signal is used to control the pulsations applied to another of said compartments, to control the rate of flow of material over the grid plate thereof.

5. A method according to claim 4 wherein the output signal is used to control the amplitude of the pulsations applied to a reject compartment adjacent to said one compartment.

6. In a wash box comprising a vessel divided vertically into water-containing compartments, including at least one stratification compartment and a reject compartment, a perforate grid plate extending across upper parts of the compartments, the wash box comprising first pulsation means associated with the stratification compartment and which is operative to produce a cyclic rise and fall in the water in the stratification compartment and a second pulsation means associated with the reject compartment and which is operative to produce a cyclic rise and fall in the water in said reject compartment, the improvement wherein the wash box comprises:
   (a) transmission means associated with the vessel to transmit signals towards the surface of the water in the stratification compartment;
   (b) receiving means associated with a vessel to receive signals reflected from the surface of the water in the stratification compartment;
   (c) an output device connected to the transmission means and to the receiving means and which is operative to measure the period of time between the transmission of each signal and reception of the reflected signal, and to operate arithmetically on the measured periods of time to produce an output signal which is dependent upon the change in the mean level of water in the stratification compartment; and
   (d) control mechanism associated with the second pulsation means and which is operative to vary the action of the pulsations applied to the reject compartment in accordance with the output signal.

7. A wash box according to claim 6, comprising a pipe extending out from the stratification compartment and upwardly therefrom, the transmission means being mounted on the vessel to transmit said signals towards the water in the pipe, and the receiving means being mounted so as to receive signals reflected from the surface of the water in the said pipe.

8. A wash box according to claim 6 wherein the frequency at which the pulsations are applied to the reject compartment is constant, and is greater than the frequency at which the pulsations are applied to the stratification compartment.

9. A wash box according to claim 6 wherein the control mechanism comprises a first control device interposed between the output device and said second pulsation means, and which is adapted to vary the relationship between the value of the output signal and the value of the pulsations applied to the reject compartment under the control of the output signal.

10. A wash box according to claim 6 comprising feed control means which is responsive to the output signal provided by the output device to control the rate at which raw material is fed to the wash box.

11. A wash box according to claim 6 wherein the transmission means generates said signals in the form of discrete pulses, and the output device is operative to measure the time taken for each pulse to travel from the transmission means to the receiving means.

12. A wash box according to claim 11 wherein transmission means generates the pulses of electro-magnetic radiation.

13. A wash box according to claim 11 wherein transmission means generates the pulses of high frequency sound radiation.

14. A wash box according to claim 11 wherein the transmission means generates pulses at a frequency which is several times the frequency at which pulsations are applied to the water in the stratification compartment by said first pulsation means.

15. A wash box according to claim 14 wherein the control mechanism comprises a selection device which is operative in a manner such that the output signal provided by the output device corresponds to the maximum height of water detected in the pipe in each cycle of pulsations applied to the stratification compartment.

16. A wash box according to claim 6 wherein the transmission means and the receiver receiving means are both provided by a single vibrating member, vibrator means being provided to cause the vibrating member to vibrate, when acting in its emitter mode, and sensing means being provided to sense the vibrations induced in the member when acting in its receiving mode.

17. A wash box according to claim 16 wherein the vibrating member is provided by a Piezo-electric device.

18. A wash box according to claim 6, being a compound wash box comprising two stratification compartments and a reject compartment associated with each stratification compartment; each stratification compartment having a pipe extending out from the stratification compartment and upwardly therefrom, transmission means, receiving means and an output device associated with each stratification compartment, wherein each such output device is adapted to provide an output signal, and the pulsations applied to each of the reject compartments are controlled by the control mechanism independently of each other.

19. A wash box according to claim 18 comprising a safety device operative to compare the output signals provided by the two output devices and to energise an alarm in the event of a disparity between said output signals greater than a predetermined magnitude.

20. A wash box according to claim 6 wherein the frequency at which the pulsations are applied to the reject compartment is an integral multiple greater than 1 of the frequency at which the pulsations are applied to the stratification compartment.

21. A wash box according to claim 20 wherein the frequency at which the pulsations are applied to the reject compartment is three times the frequency at which the pulsations are applied to the stratification compartment.

* * * * *